Feb. 13, 1968  H. E. WELCH  3,368,782
SUPPORT FOR LINEAR MEMBERS
Filed Oct. 22, 1965  5 Sheets-Sheet 1

INVENTOR.
HENRY E. WELCH
BY
ATTORNEY

Feb. 13, 1968  H. E. WELCH  3,368,782
SUPPORT FOR LINEAR MEMBERS
Filed Oct. 22, 1965  5 Sheets-Sheet 3

INVENTOR.
HENRY E. WELCH
BY
ATTORNEY

Feb. 13, 1968   H. E. WELCH   3,368,782
SUPPORT FOR LINEAR MEMBERS
Filed Oct. 22, 1965   5 Sheets-Sheet 5

INVENTOR.
HENRY E. WELCH
BY
ATTORNEY

United States Patent Office 3,368,782
Patented Feb. 13, 1968

3,368,782
SUPPORT FOR LINEAR MEMBERS
Henry E. Welch, Bennington Township, Morrow County,
Ohio (Rte. 3, Marengo, Ohio 43334)
Filed Oct. 22, 1965, Ser. No. 501,895
15 Claims. (Cl. 248—68)

ABSTRACT OF THE DISCLOSURE

Apparatus for securing a linear member in limited slidable engagement upon a support, comprising a bar, formed with a longitudinally extending flange portion and securable to the support. A plurality of knobs, spaced along the bar flange. A pair of similarly-formed cleat elements, arranged for cooperably containing the bar flange, and secured in slidable engagement thereon, intermediate adjacent flange knobs. The cleat elements are provided with bearing walls for cooperatively engaging the linear member. The degree of frictional engagement between the cleat elements and the linear member is adjustable by varying the threaded relationship of a cooperating nut and bolt combination.

---

The invention which is disclosed herein and illustrated in the appended drawings relates generally to devices for supporting linear members in a desired position, superjacent a supporting surface. More specifically, this invention relates to devices for releasably securing a linear member, such as a strand of fencing wire or an energy transmission line, for example, above a supporting surface, such as the surface of the earth.

The various embodiments of this invention may serve to releasably secure either individual strands or cables of a wire enclosure or transmission line at a variety of predeterminable vertical positions along a substantially vertical axis of a supporting structure. Various combinations of component elements, included in the combination of the present invention, afford means for releasably securing such linear members in a variety of selectable relationships with several types of supporting structures; so as to position such members above a supporting surface, as the surface of the earth for example.

Other devices, used for this purpose, commonly include a tying strand of wire, separate from the supported linear member. The tying strand is twisted about the linear member on opposite sides of a member-supporting knob device. Installation of a linear member on apparatus of this character requires considerable manipulation by the installer, in order to securely bind opposite ends of the tying wire to the linear member, and thus retain the member in permanent contact with the knob and associated supporting structure.

Inherent in this type of securing device is a continuing risk of operational failure of the frictional bond between twisted ends of the tying strand and the linear member. When such failures occur, the member is released from the supporting structure; with the result that an excessive mechanical load is imposed upon adjacent supporting apparatus.

A further objection to conventional devices for securing linear members to supports is that such devices characteristically effect a substantially rigid and inflexible mechanical connection between the linear member and the support structure. It is oftentimes desirable that a degree of flexibility be provided at such connections; to minimize the fracturing effect of momentary mechanical stresses, sometimes imposed upon such linear members as a result of either natural or accidental circumstances. Provision of a relatively flexible connection in such apparatus permits momentary strains to be distributed beyond the immediate span of the linear member, located between supporting structures most proximate to the region of the initial strain or impact.

OBJECTS

One object of the present invention is to provide apparatus, for releasably securing a linear member to a support structure; which is positionable upon said member and said structure by natural manipulation, and is mutually securable thereto by operation of a single threaded device.

A second object of the present invention is to provide a device which is adapted for slidably engaging a linear member and retaining it in limited slidable engagement with a supporting structure.

A further object of the present invention is to provide apparatus for flexibly securing a linear member to a supporting structure, wherein the member remains slidable along a plurality of coordinate axes.

Another object of the invention is to provide means, for clampably securing a linear member to a support, comprising a plurality of cooperating elements; which are mutually identical in configuration, so as to minimize manufacturing and installation costs.

A still further object of this invention is to provide a device for connecting an electrical conductor to a supporting structure; said device being adapted for manual replacement while the conductor is in a charged state, with a minimum risk of injury to replacing personnel.

DRAWINGS

In the drawings, which illustrate various embodiments of the present invention.

DESCRIPTION

Figures 8, 9, 10:
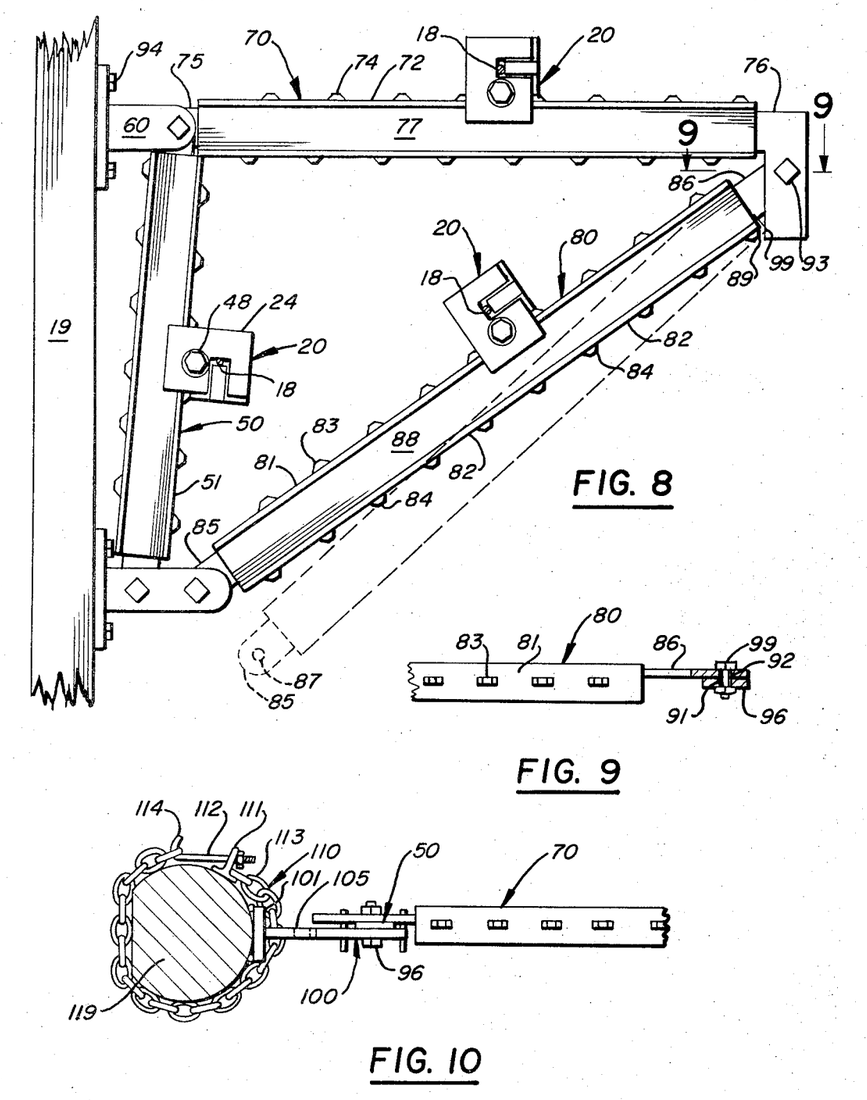
FIG. 8 shows a third embodiment of the invention, wherein the bar and beam of FIG. 6 are combined with a spar member, connected between the bar and beam; an alternative open position of the spar being indicated in broken outline.
FIG. 9 is a fragmentary view in section, taken along the lines 9—9 of FIG. 8; illustrating the pivotal connection and terminal bearing surfaces of spar and beam members of FIG. 8.
FIG. 10 shows a fourth embodiment of the present invention, including means for releasably lashing selected elements of the embodiment of FIG. 8 to a supporting structure, which is substantially circular in cross-sectional configuration.

Briefly stated, the structural combination of the present invention is seen, in the embodiment of FIG. 8, as an apparatus for securing a linear member 18 to a supporting structure 19, comprising: means 20, for frictionally engaging member 18; means 50, secured to means 20, for retaining means 20 in selectable positions, spaced along a substantially vertical axis adjacent support 19; means 60, secured to support 19 and to means 50, for retaining means 50 in spaced apart relationship with support 19; means 70, connected to means 50, for retaining means 20 in selectable spaced positions, arrayed substantially normal to support 19; mean 80, connected between means 50 and means 70, for retaining means 20 in selectable positions, spaced intermediate means 50 and means 70, according to the requirements of specific uses for which the invention is adapted.

Figures 1, 2, 3:
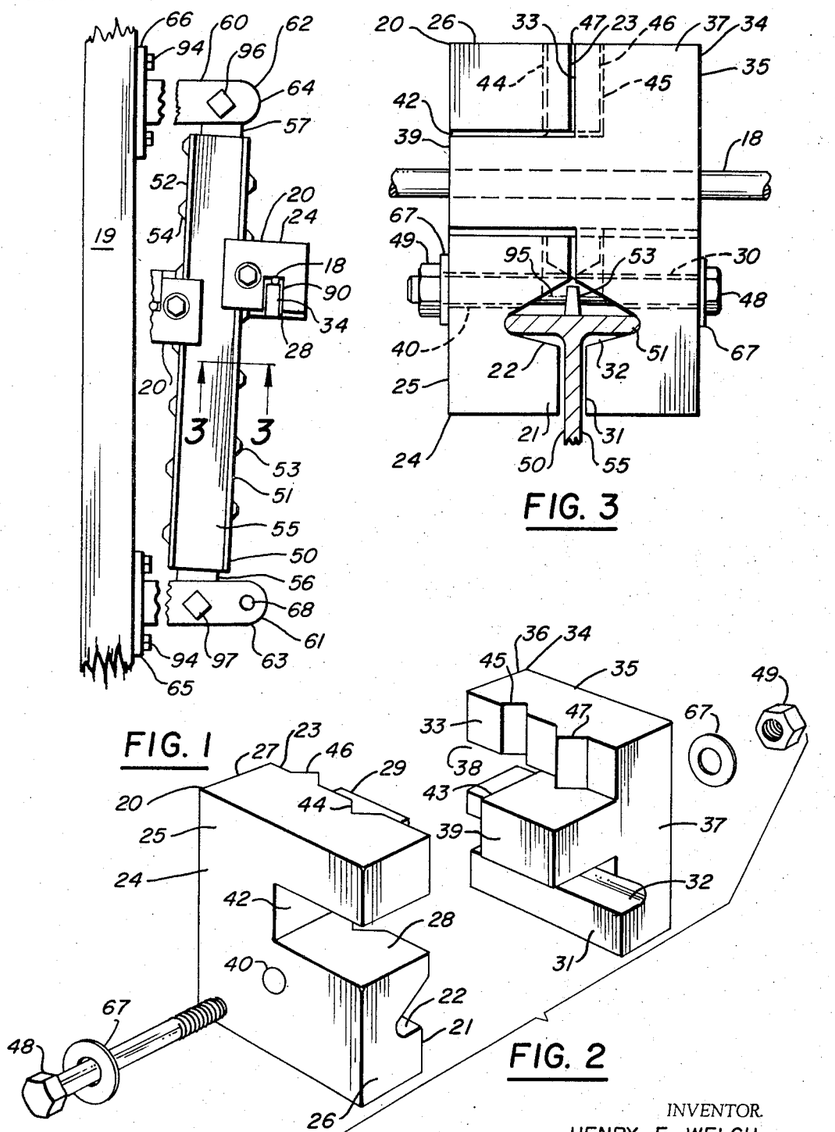
FIG. 1 is a side view, showing cleat devices of the present invention, mounted upon one embodiment of a substantially vertical support member, constructed and arranged according to this invention.
FIG. 2 is an exploded view in perspective, showing the assembled relationship of structural elements comprising a cleat device of FIG. 1.
FIG. 3 is a fragmentary sectional view, taken along the line 3—3 of FIG. 1, showing the cleat device of FIG. 2 slidably secured to a support member.

Referring more specifically to the drawings, for a detailed description of a first embodiment of the apparatus of this invention; it will be seen in FIG. 1 that means 20, for frictionally engaging linear member 18, comprises a plurality of separate block members 24 and 34, arranged for cooperating to define a conduit 90 and an interface passage 95 (FIG. 3), substantially as described hereafter.

Separate block members 24 and 34 are formed with substantially identical configurations, in order to minimize manufacturing costs and to facilitate selection of necessary structural components during field installation of block members. Identical block members 24 and 34 are shown, in the exploded perspective view of FIG. 2, to be formed with cooperable inner faces, designated 23 and 33 respectively; which are preferably identical in configuration. Faces 23 and 33 are connected to oppositely disposed faces 25 and 35, of blocks 24 and 34, by lateral faces 26 and 36, respectively.

Figures 4, 5, 6, 7:
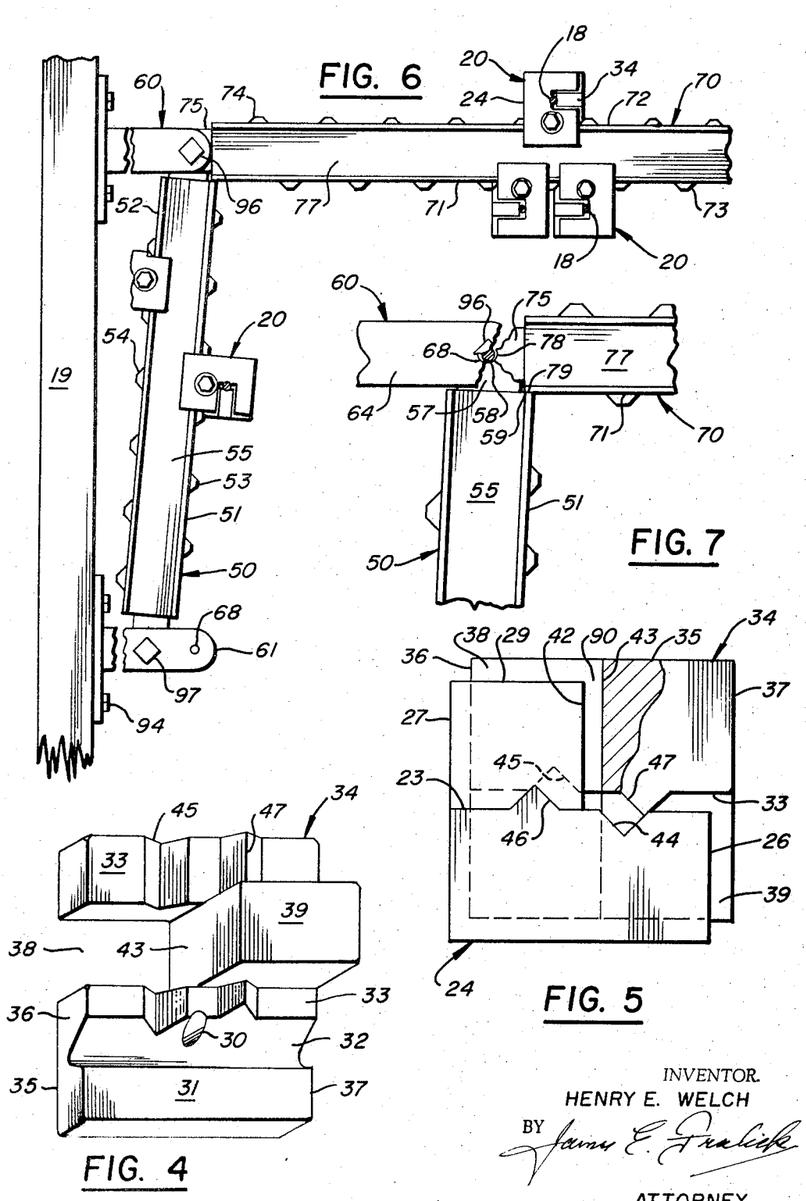
FIG. 4 is a perspective view, showing structural details of a block member included in the combination of FIG. 2.
FIG. 5 is a plan view showing a pair of the block members of FIG. 4, arranged in cooperative face-to-face relationship.
FIG. 6 shows a second embodiment of the invention, wherein a substantially vertical bar is arranged in pivotal association with a horizontally disposed beam member; the outer terminal portion of the beam being omitted.
FIG. 7 is a fragmentary view showing, in somewhat enlarged scale, the pivtol connection and terminal bearing surfaces of the horizontal beam and the vertical bar of FIG. 6; portions of various elements being omitted for clarity.

Since inner faces 23 and 33, of cooperating block members 24 and 34, are substantially identical in configuration; only the inner face 33 and lateral surface 36, of block member 34, are shown in structural detail in the perspective view of FIG. 4. It will be understood that outer face 35 of block 34 is preferably identical with outer face 25 of block 24, as shown in FIG. 2. Similarly, opposite lateral face 27 of block 24 is preferably formed so as to be identical with the configuration shown for face 37 of block 34, in the exploded view of FIG. 2.

Lateral face 36 of block member 34 (FIG. 4) defines a recessed axial passage 38, extending between inner face 33 and outer face 35. A post member 39 is located upon inner face 33, and is formed with an inner wall 43, which is coextensive with passage 38 and post 39. Wall 43 serves to define the innermost limit of passage 38.

It will be apparent, to persons of ordinary skill in the art, from the disclosures herein; that inner wall 43 may be formed with a configuration, which is especially adapted for frictional engagement of specific types of linear members. For example, the substantially plane configuration of wall 43, illustrated in FIGS. 2 and 4, is especially adapted for engaging single members such as a strand of wire or rod, or the like. When wall 43 is intended to operate most effectively in engaging a plurality of linear members, either bundled in the unitary structure of a bound cable or less compactly associated in multi-stranded association; wall 43 may be formed with a concave configuration, so as to define an arcuate line along a transverse vertical plane of passage 38 (FIG. 4).

Inner face 33 of block 34 is further formed to define a transverse cavity 32, arranged along an axis lying in a plane substantially perpendicular to that of post wall 43; so as to be in communication with oppositely disposed lateral faces 36 and 37 of block 34. A marginal tongue portion 31 is located adjacent the lower edge of block 34 and cooperates with inner wall 33 to define a transverse cavity 32. Tongue portion 31 projects from the plane of outer face 35 toward the plane of inner face 33, but preferably terminates short of the plane of the inner face (FIG. 3).

Inner face 33, of block member 34, is further formed with a projecting guide element 47 (FIG. 4); which may be located adjacent post 39 so as to extend along an axis, which is angularly disposed in relation to the longitudinal axis of wall 43 of cavity 32. A complementary guide cavity 45 is defined by face 33, and preferably lies along an axis parallel with that of guide element 47. Guide cavity 45 has a concave configuration and is dimensioned for containing a guide element 46, of a block member 24; at times when cooperating block 24 and 34 are correlated in the substantial coaxial alignment shown in FIG. 3.

It is thus apparent that when guide cavity 45 is spaced from lateral face 36, along inner face 33, by a distance substantially similar to the spacing of guide member 47, from opposite lateral face 37; identical block members 24 and 34 (FIG. 2) may be arranged in correlation, with their respective inner faces 23 and 33 in partial cooperative interengagement, as shown in FIG. 3.

A suitable bore 30 (FIG. 4) is provided in block 34, in communication at its opposite ends with outer face 35 and inner face 33. A similar bore 40 is provided in block 24 (FIG. 2). Bores 30 and 40 are proportioned and arranged for slidably receiving an interconnecting bolt 48.

Bores 30 and 40 may have slotted configurations, wherein the horizontal transverse dimension exceeds the vertical dimension of the bore, if desired. Such an arrangement will facilitate the securing of blocks 24 and 34, by bolt 38 and nut 49, in interface engagement; under circumstances where the corresponding axes of bores 40 and 30 of the blocks 24 and 34 are out of mutual registration, as illustrated in FIG. 5. However, it has been found in practice that manufacturing costs are considerably reduced; if bores 30 and 40 are formed with a substantially circular cross-section configuration.

When bores 30 and 40 are formed with inside diameters substantially greater than the major diameter of the threaded portion of bolt 48, cooperating blocks 24 and 34 may be secured together by bolt 48 in a correlation wherein the respective axes of bores 30 and 40 are in horizontal misalignment, resulting in the cooperative relationship of FIG. 5. As blocks 24 and 34 are then drawn together, by tightening nut 49 on bolt 48; the cooperating blocks are drawn through various positions of correlation of the axes of bores 30 and 40, toward ultimate registration of those axes. If the diameter of bores 30 and 40 exceeds the outside diameter of the head portion of bolt 48, or of nut 49; suitable washers 67 may be interposed between the head of bolt 48 and block 24, and between nut 49 and block 34 (FIG. 2).

Means 50, for retaining a cleat means 20 in selectable positions, spaced along a vertical axis adjacent support 19; comprises a vertical bar, designated generally as 50 in FIG. 1. Bar 50 is formed with an axially disposed central web portion 55. Marginal flange portions 51 and 52 are formed upon oppositely disposed longitudinal edges of web 55, so as to extend transversely of web 55 and project outwardly from opposite faces of the web portion (FIG. 3).

Bar 50 is further formed with a plurality of barrier knobs 53 (FIG. 1); which are spaced along the outer surface of flange 51 and may be in substantial alignment with web portion 55. Knobs 53 are preferably spaced apart by a distance substantially equal to the length of transverse passage 32 of a block member 34 (FIG. 4). However, any desired spacing of knobs 53 may be employed, which is greater than the major thread diameter of bolt 48 (FIG. 2).

A plurality of barrier knobs 54 is arranged along the outer face of flange 52 (FIG. 1). The spacing of knobs 54 is controlled essentially by the factors described above, in specific reference to knobs 53. However, it is preferred that knobs 53 and 54 be spaced apart in regularly spaced progression, with the interval between adjacent knobs 54 being substantially equal to that between regularly spaced knobs 53.

It is further preferred that knobs 54 be arranged, along flange portion 52, so as to be centered upon transverse axes of bar 50 which are located approximately mediate similar axes, on which knobs 53 are centered along flange 51. This arrangement of oppositely projecting knobs 53 and 54 places them in the staggered relationship illustrated in FIG. 1 of the drawings.

Bar 50 is further provided, at each of its opposite ends, with longitudinally extending ear portions 56 and 57, of suitable configuration; each of which is provided with a suitable bore 58 (FIG. 7).

Means 60, for securing bar 50 in spaced-apart relationship with support 19, comprises a plurality of brackets, designated individually as 61 and 62 in FIG. 1. Brackets 61 and 62 may have any suitable configuration. One form of bracket means 60, which has been found satisfactory, is illustrated in FIG. 1. Bracket 61 is formed with a projecting member 63, secured along one margin to a base plate 65. A plurality of bores 68 may be provided in bracket member 63, for receiving mounting bolts; such as bolt 96, by which bar 50 is secured to bracket 61.

Bracket 62 is formed with a projecting arm 64, secured along one margin to base plate 66. Bracket arm 64 is provided with a suitable bore, for receiving an upper mounting bolt 96; whereby the upper end of bar 50 is secured to bracket 62.

Base plates 65 and 66, of brackets 61 and 62, are secured to supporting member 19 by any appropriate means. Lag screws 94, contained within suitable bores in base plates 65 and 66, have been found satisfactory for securing brackets 61 and 62 to a supporting structure for which such fastening devices are appropriate. Other means may be provided for securing brackets 61 and 62 to supporting structures, which are not suited for receiving lag screws.

OPERATION OF FIRST EMBODIMENT

In operation, the elements of the first embodiment of the present invention, as described above, are assembled substantially as shown in the illustration of FIG. 1. A pair of cooperating block members 24 and 34, each of which is formed with the general configuration of block 34 as seen in FIG. 4, is arranged in the cooperative relationship of interface engagement shown in FIG. 2.

Blocks 24 and 34 may thus be manually positioned on opposite sides of a support member 50 and simultaneously arranged oppositely about a linear member 18; with a flange portion 51 of bar 50 contained within transverse cavity 95 of the assembled cleat 20 (FIG. 3) and linear member 18 contained within an expansible conduit 90 (FIG. 1), defined by upper and lower walls of passages 28 and 38, and oppositely disposed inner post walls 42 and 43 (FIG. 5), of blocks 24 and 34 respectively.

When blocks 24 and 34 are thus positioned, tongue members 21 and 31 are located on opposite sides of web portion 55 of bar 50 (FIG. 3). Flange 51 is then contained within an interface passage 95, defined by oppositely disposed transverse channels 22 and 32 of blocks 24 and 34. The application of manual pressure upon oppositely disposed lateral faces 37 and 27, of the cooperating block members, will then draw the members toward the substantially cubical cleat configuration of FIG. 3.

Bores 30 and 40 are so formed that even though they may be correlated with their respective axes horizontally misaligned; they will be in sufficient alignment for receiving a bolt 48 (FIG. 3), when guide post 47 of block 34 engages a recessed surface of guide cavity 44, in block 24 (FIG. 5).

When nut 49 is tightened upon the projecting, threaded end of bolt 48 (FIG. 3), block 24 is drawn toward block 34. As the cooperating blocks are thus drawn together, guide members 46 and 47 cooperate with guide cavities 45 and 44, respectively (FIG. 5); so as to draw post walls 42 and 43 toward each other, thus reducing the cross-sectional area of axial passage 90, wherein linear member 18 is contained (FIG. 1).

As post members 29 and 39 are thus drawn toward each other, they are brought into clamping frictional engagement with oppositely disposed surfaces of linear member 18. The degree of frictional engagement between linear member 18 and post walls 42 and 43 may be adjusted by tightening or loosening nut 49 on bolt 48 (FIG. 3). This adjustment serves to determine the quantum of mechanical stress which must be exerted upon linear member 18 before arresting frictional forces will be overcome, permitting member 18 to slide axially through conduit 90 until the operational degree of stress is relieved.

When cleat device 20 is assembled, substantially as described above, it is seen that flange 51 of bar 50 is contained within an interface passage 95, defined by transverse channels 22 and 32 of inner block faces 23 and 33, respectively.

Interface passage 95 is so formed that a pair of blocks 24 and 34, arranged in the mutual configuration of cooperative engagement illustrated in FIG. 5, may be moved throughout the length of a flange member 51, without limitation (FIG. 3). This is true since the configuration of interface passage 95 allows free movement of web portion 55, flange portion 51, and successive knobs 53 through passage 95 as shown in FIG. 3.

Bores 40 and 30 (FIGS. 2 and 4) are so arranged that a bolt 48 may be passed through bore 40, through an open interval between adjacent knobs 53 on bar 50, and through bore 30; so as to retain blocks 24 and 34 upon a flanged portion 51 of bar 50, as seen in FIG. 3. It is thus apparent that: while cleat device 20 is slidable longitudinally of bar 50, bolt 48 operates to limit sliding motion of cleat 20, along bar 50, to the span of an open interval between adjacent barrier knobs 53.

It is also apparent that when a linear member 18 is frictionally engaged between oppositely disposed walls 42 and 43 of conduit 90; and cleat member 20 is assembled, as described above, for limited slidable engagement with a bar 50, which is substantially vertically disposed: cleat 20 is in a position wherein bolt 48 is in gravitational contact with the upwardly disposed surface of a knob 53.

When abnormal axial stress is imposed upon linear member 18, cleat 20 may move upwardly along bar 50, until bolt 48 is brought into contact with the lower surface of the upwardly adjacent knob 53. If the magnitude of an imposed stress is sufficient to overcome frictional engagement between opposite walls 42 and 43, of conduit 90, and linear member 18; the member will move axially, through conduit 90, to the extent required for relief of the actuating stress.

Figure 14:
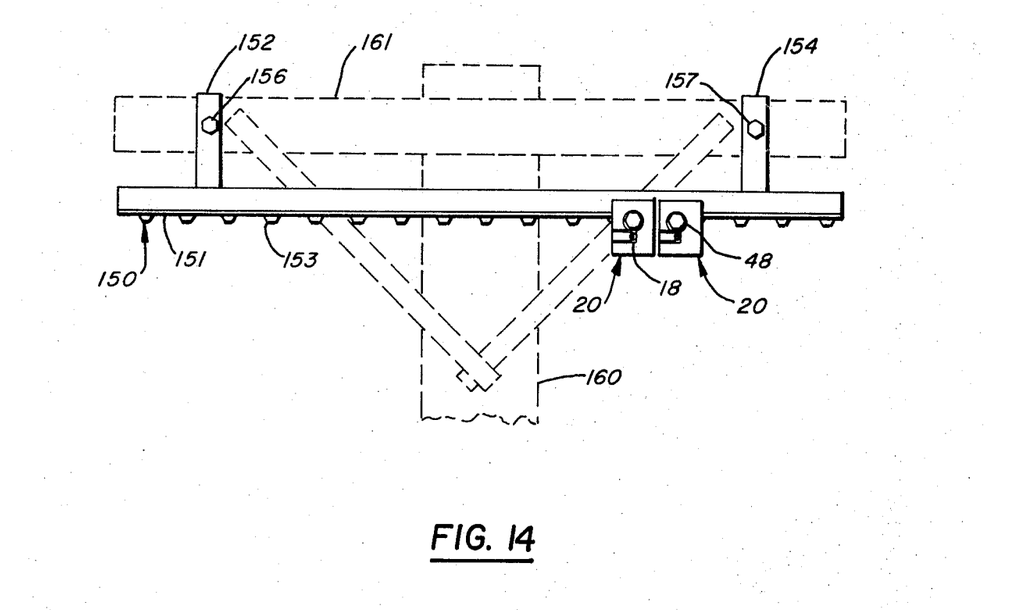
FIG. 14 shows a fifth embodiment of the present invention, in structural association with a utility pole, which is provided with a type of wooden crossarm, common to such structures; the supporting pole, crossarm and crossarm bracing being represented in broken outline.

From the above description and the disclosure of FIGS. 3 and 14, it will be apparent that the cleat device 20 of this invention may be assembled directly upon a vertically disposed metal fence post, which is formed with a suitable cross-sectional T configuration and is provided with longitudinally spaced knob barriers. When the cleat device 20, of this invention, is used in this manner with a compatibly formed metal fence post; a linear member, such as a fencing wire for example, may be secured to the post as described above, by the cleat device disclosed herein.

Under circumstances where it is desired to conduct an electric current, or to maintain an electrical charge, upon a linear member 18, as in an electrified fence installation, for example; block members 24 and 34 of cleat device 20 may be formed from a suitable material having dielectric properties which will afford electrical isolation for linear member 18 from an electrically conductive support member, as required by the nature of the electric current or charge to be accommodated in the system. For example, block members 24 and 34 may be manufactured as molded ceramic articles, which are characterized by high structural and dielectric strength and are relatively impervious to normal weathering.

In those installations, where it is desired to secure linear members to supporting structures, formed of wood, masonry, or concrete; a bar 50 may be spaced outwardly from the supporting structure by suitable brackets 60, substantially in the manner illustrated in FIG. 1. A bracket means 60 may be secured by suitable means, such as a bolt 96 for example, to oppositely disposed tongue members 57 and 56 of bar 50. The base portion 66 of bracket 60 may then be secured to a surface of the supporting structure 19 by lag screws 94, or other fastening means appropriate to the nature of the structure.

In an installation where it is desired to secure a plurality of electrically charged linear members 18, spaced apart for electrical isolation, in substantially vertically spaced array; it has been found desirable for the linear members to be so arranged that a broken member is not likely to gravitate into electrical contact with a subjacent member in the vertical array.

Thus bar 50 may be installed, in an electric fence installation for example, along an axis which is angularly disposed in relation to a vertical surface of the supporting structure 19. It has been found that such angular relationship between a vertical surface and the axis of bar 50 will substantially minimize the risk of electrical short circuit, resulting from gravitational movement of broken electrical conductors 18.

When an electric fence installation is arranged in this manner, a suitable bracket 61 (FIG. 1) may be secured to lower tongue portion 56 of bar 51, by a bolt 97, located in a bore, spaced closer to supporting structure 19 than bolt 96, which connects upper tongue portion 57 of bar 50 to upper bracket 62.

In such an installation, it is seen that alternate location of each successive element, in a vertical array of linear conductors 18, on oppositely disposed flange portions 51 and 57; and alignment of cleat devices 20, located on opposite flange portions of bar 50, out of mutual vertical registration: will substantially reduce the normal risk of inadvertent short circuit resulting from gravitational movement of superposed conductors 18.

SECOND EMBODIMENT

The second embodiment of this invention is illustrated in FIG. 6 of the drawings, and includes apparatus comprising the first embodiment, substantially as illustrated in FIG. 1.

In the second embodiment, elements of the first embodiment are further combined with means 70, connected to bar 50, for retaining a cleat 20 in selectable spaced positions, arrayed substantially normal to supporting structure 19. Means 70 comprises a beam member 70, which is formed with a cross-sectional configuration similar to that indicated for bar 50 in FIG. 3. Beam 70 is provided with a longitudinal web portion 77, bounded by opposite flange portions 71 and 72; upon which barrier knobs 73 and 74, respectively, are spaced at alternate intervals, substantially as previously described in specific reference to the structure of bar 50.

A terminal tongue portion 75 projects from one end of beam 70, in axial alignment with web portion 77 of the beam. Tongue 75 is provided with a bore 78, as shown in the enlarged, fragmentary view of FIG. 7. Bore 78 is preferably spaced from the proximal end of web 77 by a distance not greater than half the transverse dimension of web portion 55 of bar 50, in the second embodiment. When a bar 50 is to be incorporated in the combination of the second embodiment, bore 58 of ear 57 is preferably spaced from the proximal end of web 55, by a distance not greater than half the transverse dimension of web portion 77 of the associated beam 70.

With bores 58 and 78 thus arranged in the respective structures of bar 50 and beam 70; a bolt 96 may be inserted, through bore 68 of bracket 60, bore 58 of bar 50, and bore 78 of beam 70, as as to secure beam 70 in pivotal engagement with bracket 60 and bar 50. When beam 70 is thus combined with the first embodiment, it is seen in FIG. 7 that a portion of the lower surface of flange 71, serves as a bearing surface 79, which rests upon terminal bearing edge 59 of flange portion 51 of bar 50.

It thus appears that in the second embodiment, beam 70 is arranged in cantilevered relationship with vertical bar 50. Bearing surface 59 of bar 50 cooperates with bearing surface 79 of beam 70 to limit pivotal rotation of beam 70 about bolt 96 and to support beam 70 in the cantilevered configuration of FIG. 6.

A plurality of cleat means 20 may be arrayed along flanges 71 and 72, in the manner previously described with specific reference to the first embodiment, for securing linear members 18 to beam 70. Since knobs 73 and 74 are located in staggered relationship, along opposite flange portions of beam 70; it is apparent, from the illustration of FIG. 6, that contained linear members 18 are necessarily arrayed along beam 70, out of substantial vertical alignment, in the combination of the second embodiment.

A first plurality of cleat devices 20, in frictional engagement with linear members 18, may thus be arranged, along flanges 51 and 52 of bar 50, substantially parallel to a vertical surface of support means 19. A second plurality of linear members 18 may be similarly secured, by cleat devices 20, upon flange portions 71 and 72 of bar 70, and the included devices are necessarily arranged substantially normal to the vertical surface of support 19.

Since beam 70 is formed with a cross-sectional configuration similar to that of bar 50, and all cleat devices 20, which are intended for use with the second embodiment, are substantially identical with those previously described in the first embodiment (FIG. 3); it will be apparent that linear members 18 are secured to the several bar and beam elements of the second embodiment, in substantially the manner previously described with reference to the first embodiment.

THIRD EMBODIMENT

The third embodiment of the invention includes elements of the second embodiment, illustrated in FIG. 6 and described above; in further combination with means 80, connected between bar 50 and beam 70, for retaining a cleat 20 in selectable positions, spaced intermediate bar 50 and beam 70. Means 80 comprises a spar member, designated generally as 80 in FIG. 8. Spar 80 is preferably formed with a cross-sectional configuration similar to those of beam 70 and bar 50, as indicated in FIG. 3 and previously described. In the third embodiment, beam 70 is formed with a depending bearing block member 76, defining a pivot bore 91 (FIG. 9) and a lateral bearing surface 99.

Spar 80 (FIG. 8) includes a web portion 88 and marginal flanges 81 and 82, provided with alternately spaced knobs 83 and 84, respectively. Tongue members 85 and 86 project axially from opposite ends of web 88. Lower tongue 85 is provided with a suitable connecting bore 87.

Upper tongue 86 is formed with a pivot bore 92; which is spaced from the proximal end of web 88 by a sufficient interval for bearing edge 89 of web 88 to lie between bearing surface 99 of depending block 76 and bar 50, when bore 87 of lower tongue 85 is in registration with bore 68 (FIG. 1) of bracket 61. Opposite tongue portions 85 and 86, of spar 80 (FIG. 8), are connected by bolts 98 and 93 to bracket 61 and bearing block 76, respectively.

When elements of the third embodiment are arranged, according to the solid line rendering of FIG. 8, and lower connecting bolt 98 is removed; spar 80 will rotate, gravitationally, about pivot bolt 93 to an open position, represented by the broken line rendering in FIG. 8. Further rotation of spar 80, about pivot 93, is arrested by contact engagement between bearing edge 89 of spar 80 and bearing surface 99 of block 76.

It is thus seen that tongue 86 and bearing surfaces 89 and 99 cooperate to retain spar 80 in an open position, wherein lower tongue 85 of the spar remains manually accessible to line construction or maintenance persons; whose sphere of manual accessibility may be limited to an area adjacent supporting structure 19.

From the illustration of FIG. 8, it will be apparent that linear members 18 may be added to or removed from cleat devices 20, which are located upon inner flanges 81, 71, and 51; without either severing the linear member or dismantling the assembled structure, beyond removal of spar 80 from the closed to open positions. This operation may be accomplished by the simple expedient of removing connector bolt 98, and permitting bar 80 to rotate gravitationally about pivot 93 to the open position, wherein bearing surfaces 89 and 99 are in contact engagement, as described above.

Any of cleat devices 20 may then be manually disassembled by removing bolt 48 and separating block components 24 and 34 from mutual engagement with a linear member 18 and flange portion 51. When a linear member 18 is thus released, it may be removed from confinement within the perimeter defined by flanges 51, 71, and 81; by passing it through the open interval between lower bracket 61 and tongue portion 85, in the open configuration of FIG. 8.

FOURTH EMBODIMENT

Figure 11:
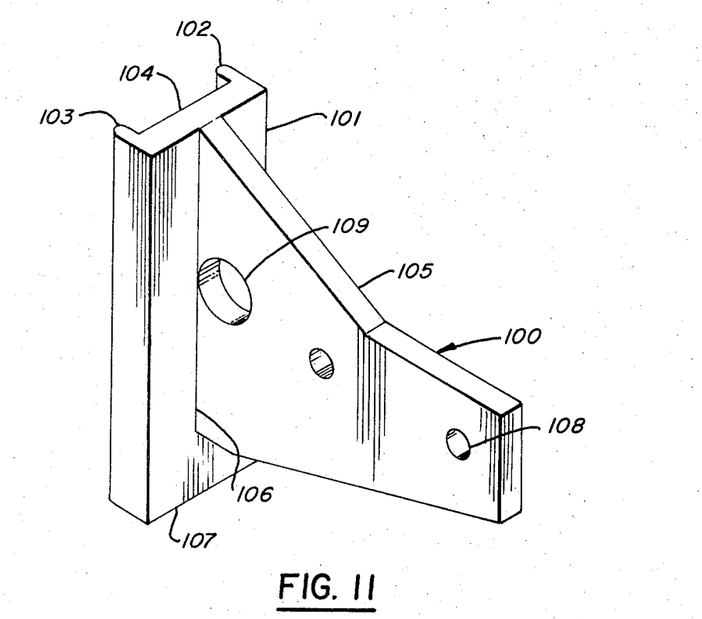
FIG. 11 is an enlarged view in perspective, showing the support-engaging bracket of the embodiment of FIG. 10.
Figure 13:
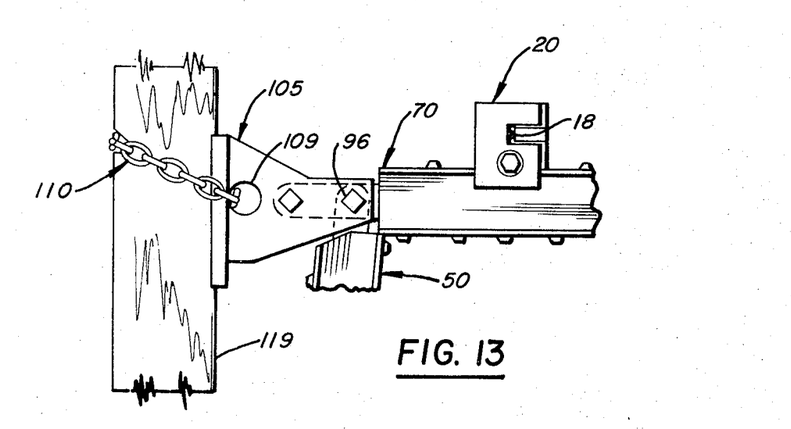
FIG. 13 is a fragmentary side view of the embodiment of FIG. 10, lashed to a supporting structure.

The fourth embodiment (FIGS. 10 and 13) comprises bar 50, beam 70, and spar 80, of the third embodiment; in combination with means 100, for releasably lashing selected elements of the embodiment of FIG. 8 to a supporting structure, which is substantially circular in cross-sectional configuration (FIG. 10). Means 100 comprises a lashable bracket, designated generally as 100 in the perspective view of FIG. 11. Bracket 100 is formed with a base pad 101, which may be provided with oppositely disposed friction rails 102 and 103 arranged in parallel relationship upon inner face 104 of the base pad. It will be understood that the provision of friction rails 102 and 103 serve to adapt bracket 100 for bi-lateral frictional engagement with an arcuate supporting structure 119 (FIG. 10); having various radii. Elimination of the fricition rails and substitution of an inner face 104, formed with a suitable concave configuration, are within the scope of the present invention.

A projecting arm 105 is secured along its base margin 106 to outer face 107 of base pad 101. Suitable bores 108 may be provided in arm 105 for connecting vertical bar 50 to the arm. An opening 109, defined by arm 105, is located adjacent base margin 106 of arm 105. Opening 109 is formed with a configuration and proportions, which are suitable for slidably receiving lashing means (FIG. 10).

Means, for releasably lashing bracket 100 to support structure 19, preferably comprises a chain 110. A plate 111, is secured to a pad 112, which is arranged in linked engagement with a terminal link 113 of chain 110. A suitable connecting means, comprising hook member 114, may be contained within a bore of plate 111, for releasably connecting chain 110 in the lashed configuration of FIG. 10.

Figure 12:
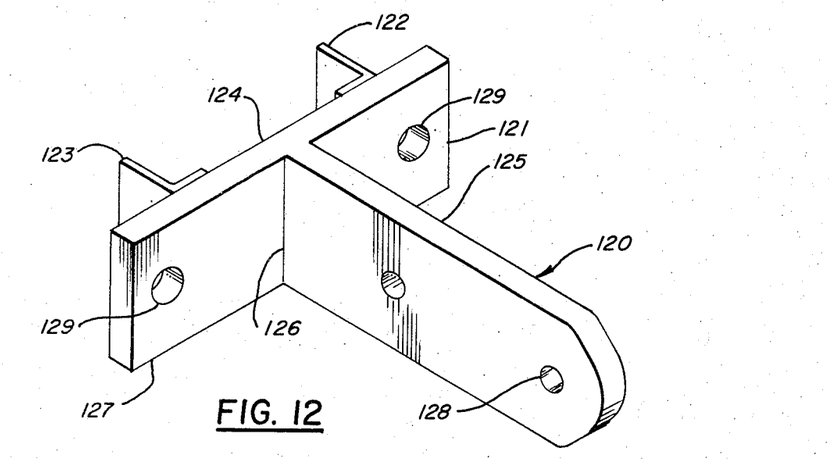
FIG. 12 is a view in perspective, showing a support-engaging bracket suitable for adapting the embodiments of FIGS. 1, 6 and 8; for use with supporting structures having the substantially circular cross-sectional configuration of FIG. 10.

A lashing bracket 120 (FIG. 12) may be provided for releasably securing bar 50 and spar 80, substantially in the manner just described, to circular supporting structure 119. Bracket 120 is formed with a base plate 121. Oppositely disposed friction rails 122 and 123 are arranged in parallel relationship upon inner face 124 of pad 121.

A projecting arm 125 is secured, along base margin 126, to outer face 127 of pad 121. Suitable connecting bores 128 are provided in arm 125. Lashing bores 129 are located between opposite ends of base pad 121 and the proximal friction rails 122 anud 123. A suitable lashing member, such as a chain or cable (not shown) may be employed, in cooperation with lashing bores 129, for releasably securing bracket 120 to the circular supporting structure 119 of FIG. 10.

The fourth embodiment of this invention is particularly adapted for the temporary installation of supporting apparatus for a plurality of power or communication lines, under emergency field conditions. It is characterized by rapidity of manual assembly, from a minimal selection of prefabricated, interchangeable structural components.

FIFTH EMBODIMENT

The fifth embodiment of the invention is seen in FIG. 14 as comprising an apparatus for adapting a crossarm 161, carried by a communication utility pole 160 and supporting electrical conductors, to accommodate additional linear conductors. The fifth embodiment comprises a beam 150; formed with a web portion 155 and a flange portion 151, secured along a margin of the web portion.

Barrier knobs 153 are arranged, in spaced-apart relationship upon the surface of flange 151, opposite web 155. Suitable truss members 152 and 154 are secured, by suitable means, to beam 150. Truss members 152 and 154 may be provided with connecting bores, suitable for accommodating fastening means 156 and 157; whereby beam 150 may be secured in spaced-apart relationship with a conductor bearing crossarm 161 of a utility pole 160.

It will be apparent, from the foregoing description of the invention and the associated drawings, that a plurality of cleat devices 20 may be arranged, intermediate adjacent knobs 153 upon flange 151 of beam 150, and may be secured thereto by suitable bolts 48, so as to support linear conductors 18 upon a pole 160; substantially in the manner previously described in specific reference to the first four embodiments of the present invention.

It is to be understood that the disclosed embodiments of the present invention are shown and described for purposes of illustration only. Various changes may be made therein, and substitution of elements may be made between the disclosed embodiments, without departing from the spirit and scope of this invention.

I claim:

1. A device for securing a linear member to a support, formed with a flange, comprising: a block, having oppositely disposed outer and inner faces interconnected by a lateral face; means, comprising a clamping wall, recessed within said lateral face, for engaging said linear member; and means, comprising a marginal tongue arranged adjacent said inner face, so as to cooperate therewith to define a transverse channel, for slidably containing a portion of said flange.

2. A pair of devices according to claim 1, arranged in face-to-face relationship, with said linear member contained intermediate respective member engaging means of each of said pair of devices; said support being contained intermediate respective support engaging means of each of said pair of devices.

3. The combination of claim 2, in further combination with means, for securing said pair of devices in face-to-face engagement.

4. A pair of devices according to claim 3, in further combination with means, for retaining the respective inner faces of said devices in face-to-face relationship.

5. A device for securing a linear member to a support formed with a flange, comprising: a block, having oppositely disposed outer and inner faces interconnected by a lateral face; said lateral face defining an axial passage in communication with said outer and inner faces; means, comprising a post, located upon said inner face, for engaging said linear member; means, comprising a marginal tongue, extending from the plane of said outer face toward the plane of said inner face, for engaging said flange; means, comprising a transverse cavity defined by said marginal tongue and said inner face, for containing a portion of said support; a guide member, located upon said inner face; and a guide cavity, defined by said inner face.

6. A device for securing a linear member to a support, comprising: means, comprising a plurality of cooperable blocks, for defining a conduit of variable cross-section; means, for securing said blocks in face-to-face relationship at variable positions of axial correlation; means, comprising a guide member located on one of said blocks, for bearing upon another of said blocks, at times when said blocks are out of coaxial registration; means, comprising a cavity defined by one of said blocks, arranged in cooperating engagement with a guide member of another of said blocks for urging said plurality of blocks toward positions of coaxial registration, wherein said linear member is frictionally engaged by opposite walls of said conduit means, for adjusting the degree of frictional engagement between said member and said conduit; and means, comprising an interface passage defined by adjacent faces of said blocks, for slidably containing said support.

7. Apparatus for securing a linear member to a support, comprising: a bar, formed with a flange; means, for securing said bar to said support; means, comprising a cleat slidably secured to said bar, for frictionally engaging said linear member; means, for restricting movement of said cleat longitudinally of said bar; and means, cooperable with said movement restricting means, for varying the degree of frictional engagement between said engaging means and said member.

8. Apparatus for securing a linear member to a support, comprising: a bar, formed with a web portion; a marginal flange, located upon said web portion; means, comprising a bracket, for securing said bar to said support, in substantially parallel relationship; means, comprising a cleat slidably retained upon said flange, for securing said linear member to said bar; said cleat means comprising a plurality of block members, cooperatively defining a conduit, having variable cross-sectional area; and means, provided on said block members, for cooperatively urging said conduit into frictional engagement with said linear member.

9. Apparatus for securing a linear member to a support, comprising: a vertical bar, secured to said support; said bar being provided with an upwardly disposed bearing face; a beam, pivotally secured adjacent said bar and supportable upon said bearing portion at times when desired; means, comprising a spar, secured at opposite termini to said bar and said beam, for supporting said beam in a position of angular relationship with said bar.

10. Apparatus for securing a plurality of members to a support, comprising: means, comprising a bar secured to said support, for retaining a plurality of said members in substantially vertical spaced relationship; means, comprising a beam pivotally connected to said bar, for retaining a plurality of said members in spaced array; means, comprising a bearing surface, for supporting said beam means in angular relationship with said bar means; and means, comprising a plurality of cleats, securable upon said bar means and said beam means, for frictionally engaging said members.

11. Apparatus for securing a plurality of members to a support, comprising: means, comprising a bar secured to said support, for retaining a plurality of said members in substantially vertical spaced relationship; means, comprising a beam pivotally connected to said bar, for retaining a plurality of said members in substantially horizontal spaced relationship; means, comprising a bearing surface located upon said bar, for limiting pivotal motion of said beam toward said bar; means, comprising a spar, releasably secured to said bar and pivotally connected to said beam, for retaining one of said members intermediate said bar and said beam; means, comprising a bearing arm located upon said beam means, for limiting pivotal motion of said spar away from said beam, at times when said spar is released from said bar; and means, comprising a cleat, securable upon said bar means, said beam means and said spar means, for frictionally engaging one of said members.

12. Apparatus for securing a plurality of members to a support, comprising: means, comprising a bar secured to said support, for retaining a plurality of said members in substantially vertical spaced relationship; means, comprising a beam connected to said bar, for retaining a plurality of said members in substantially horizontal spaced relationship; means, comprising a spar, secured at opposite ends to said bar and said beam, for retaining one of said members intermediate said bar and said beam; and means, comprising a plurality of cooperable blocks, for clampably securing one of said plurality of members in slidable engagement with said bar means, said beam means and said spar means; each of said blocks being formed with an inner face, arranged in complementary relationship with an inner face of the other of said blocks.

13. The apparatus of claim 11, wherein the means, for securing the bar to the support, comprises: means, comprising a pad, for frictionally engaging said support; a support engaging face located upon said pad; means, for securing said member to said pad; means, comprising a lashing member, for retaining said face in frictional engagement with said support; and means, comprising a lashing bearing located upon said pad, for slidably receiving said lashing means.

14. The apparatus of claim 13, wherein: means, comprising a guide member is provided upon said support engaging face, for frictionally engaging an extra-planar surface of said support.

15. Apparatus for adapting a crossarm, supporting an electrical conductor, to accommodate additional conductors, comprising: a beam; a plurality of barriers, spaced along a margin of said beam; means, comprising a truss member secured to said crossarm and to said beam, for supporting said beam upon said crossarm means, comprising a cleat slidably secured to said beam, for frictionally engaging said conductor; means, cooperable with said barriers, for restricting movement of said cleat longitudinally of said beam; and means, cooperable with said movement restricting means, for varying the degree of frictional engagement between said conductor engaging means and said conductor.

References Cited

UNITED STATES PATENTS

| 2,089,370 | 8/1937 | Heinrich et al. | 248—231 X |
| 2,423,785 | 7/1947 | Markman | 248—221 X |

FOREIGN PATENTS

| 1,678 | 1915 | Great Britain. |

JOHN PETO, *Primary Examiner.*

J. F. FOSS, *Assistant Examiner.*